INVENTOR
CARL GREENBLUM
BY Ronald J. Kransdorf
ATTORNEY

Feb. 18, 1969 C. GREENBLUM 3,428,852

DISPLAY SYSTEM

Filed Jan. 20, 1967 Sheet 3 of 3

1

3,428,852

DISPLAY SYSTEM

Carl Greenblum, Stamford, Conn., assignor to The Bunker-Ramo Corporation, Stamford, Conn., a corporation of Delaware Filed Jan. 20, 1967, Ser. No. 610,562
U.S. Cl. 315—22 16 Claims
Int. Cl. H01j *29/72*

ABSTRACT OF THE DISCLOSURE

A display system of the type which provides a plurality of writing strokes for each sweep of a viewing screen including circuitry for intensifying the image on the viewing screen by increasing the width of each writing stroke by a controlled amount. This increase may be accomplished by superimposing a high frequency waveform at right angles to the writing stroke. Where there are a plurality of viewing screens, further intensification is achieved by converting short video input pulses into longer pulses which control the display devices.

This invention relates to display systems of the type utilizing an electro-responsive beam which sweeps across a viewing screen. More particularly, this invention relates to such display systems, the raster pattern of which is formed by performing a separate sweep of the viewing screen for each line of data to be displayed and circuitry for intensifying the images in such displays.

Of the display devices which are available, the one which is perhaps the most versatile and popular is the cathode ray tube (CRT). Where high resolution is required, a television type raster scan may be used with such a tube. However, where low resolution is acceptable, as with alpha-numeric or graphic displays, the band width required to transmit data for the display is substantially reduced by using a raster pattern which provides a separate horizontal sweep of the viewing screen for each row of data to be displayed. A plurality of vertical strokes is superimposed on the horizontal sweep and data are projected on the screen by selectively energizing the sweeping beam of the CRT during the various vertical strokes.

One serious limitation of CRT's operated in the single-sweep-per-row raster pattern is the limited amount of brightness which may be achieved from the display. This results from the fact that the scanning beam is relatively thin and therefore traces a relatively thin line on the tube phosphor. While the electrical energy applied to this beam may be increased to some extent, thereby increasing the brightness obtained from the phosphor, if the beam energy is increased beyond a certain point, the phosphor is overdriven, resulting only in damage to the phosphor with no increase in image brightness. The width of the beam may be increased somewhat by defocussing. This, however, results in a fuzzy image, the width of which may not be controlled and, since the total energy of the beam is not increased, does not increase the beam brightness. The limited brightness which may now be achieved from a CRT is generally adequate for displays which are to be viewed from a few feet or less. However, the brightness limitation has severely restricted the use of CRT's in large displays which are to be viewed from several yards or more.

A related problem ooccurs when several CRT's are to be controlled by common deflection voltages and are to be energized by multiplexing a train of video inputs derived from a single input line to the various CRT's. Under these conditions, the video inputs to each CRT are short pulses which cause only a small dot to be placed on the viewing screen. The dots are barely visible from any distance. This results in a further restriction on the use of CRT's in display systems.

2

Another problem which occurs, particularly when a multiline graph is to be displayed, is that of distinguishing the video dots for one line from those for another. One way is which the dots could be distinguished would be to provide a different illumination pattern for the dots of each line.

It is therefore a primary object of this invention to provide an improved display system.

A more specific object of this invention is to provide greater illumination from a display system using a CRT or similar electro-responsive-beam display device.

Another object of this invention is to permit a display system utilizing a plurality of CRT or similar display devices to have its video inputs time-shared on a single line and multiplexed to the various display devices while still providing adequate illumination from each video spot.

Another object of the invention is to permit various portions of the display to have different illumination patterns so that they may be easily distinguished.

In accordance with the above objects this invention provides a display system which includes one or more CRT's or similar display devices. Each display device includes an electro-responsive beam which operates on a viewing screen. The electron beam, or beams, is electrically controlled to perform a plurality of writing strokes in a predetermined raster pattern. The width of each of the writing strokes is increased by a controlled amount to increase the area covered by each stroke and also the brightness of the stroke. The stroke width increase may be accomplished by superimposing a high frequency waveform at substantially a right angle to the stroke.

The foregoing and other objects, features and advantages of the invention will be apparent from the following more particular description of a preferred embodiment of the invention, as illustrated in the accompanying drawings.

Figure 1:
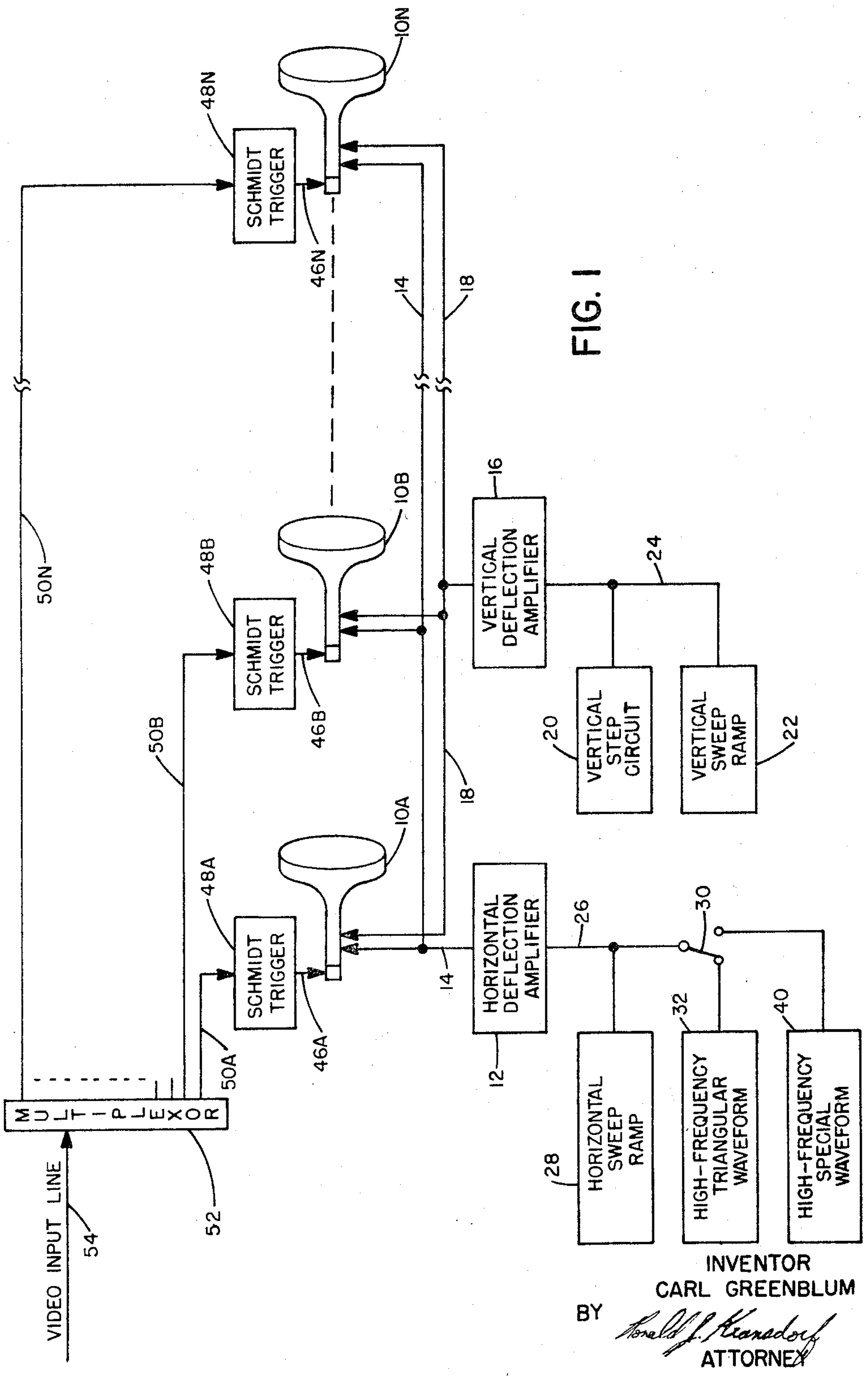
FIG. 1 is a semi-block schematic diagram of a preferred embodiment of the invention.
Figure 7:
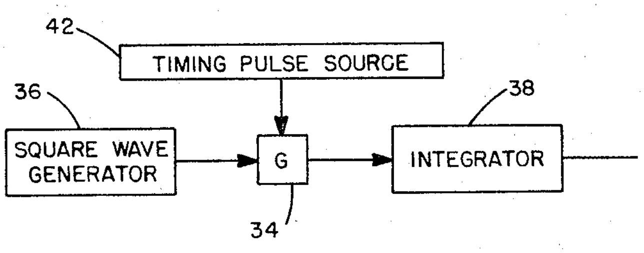
FIG. 7 is a block diagram of a high-frequency waveform generator suitable for use with the embodiment of the invention shown in FIG. 1.

Referring now to FIG. 1, it is seen that the preferred embodiment of the invention includes a plurality of cathode ray tubes (CRT's) 10A–10N. Horizontal deflection voltages are applied to the tubes from horizontal deflection amplifier 12 through common horizontal deflection line 14 and vertical deflection voltages are applied to the tubes from vertical deflection amplifier 16 through common vertical deflection line 18. The outputs from a vertical step circuit 20 and a vertical-sweep ramp circuit 22 are applied through a common line 24 to the input of vertical deflection amplifier 16. This vertical control circuit may be identical to that shown in copending application, Ser. No. 460,117, filed by R. D. Belcher et al., on June 1, 1965, entitled, "Data Handling Apparatus," and assigned to the assignee of the instant application. One input to horizontal deflection amplifier 12 is output line 26 from horizontal-sweep ramp circuit 28. The horizontal sweep circuit is likewise shown in the above-mentioned Belcher et al. application. The movable arm of switch 30 is also connected to line 26. In FIG. 1 switch 30 is shown as being connected to the output from high-frequency triangular waveform generator 32. When switch 30 is in this position, the resulting waveform on line 26 is that shown in FIG. 2H. Waveform generator 32 may, for example, be of the type shown in FIG. 7 with gate 34 either being bypassed or continuously conditioned. When the square wave from generator 36 is applied to integrator 38, a ramp output signal results. If the decay circuit for the integrator has a long time constant, a triangular waveform is obtained.

When switch 30 (FIG. 1) is in its alternative position, high-frequency, special waveform generator 40 is connected to line 26 rather than triangular waveform generator 32. The special waveform may, for example, be a step wave. If the vertical edges of the steps are sloped rather than straight, a circuit of the type shown in FIG. 7 may be utilized to generate the special waveform. Gate 34 is conditioned by a timing pulse from circuit 42 when a vertical portion of the step is desired and deconditioned when a horizontal portion of the step is desired. Decay of the integrator output is inhibited until the end of the square wave is reached. The reason for the special waveform generator 40 will be described shortly in conjunction with the description of the circuit operation.

The intensity input to each of the CRT's 10A–10N is an output line 46A–46N respectively from a corresponding Schmitt trigger, or similar single-shot circuit, 48A–48N. The triggering input to each of the circuits 48A–48N is a corresponding output line 50A–50N from multiplexer 52. A train of video input pulses is applied to multiplexer 52 from a cyclic source, such as a delay line or similar device, over line 54. Referring to FIGS. 2A–2E, it is seen that the pulses on line 54 occur in a cyclic fashion with the position of a pulse in the cycle indicating the CRT which it is intended for. For example, a pulse occurring during the first time slot of a cycle is for CRT 10A, a pulse in the second time slot is for CRT 10B, etc. The duration of each of the Schmitt triggers 48A–48N is slightly less than the duration of a video pulse cycle.

*Operation*

Figure 2:
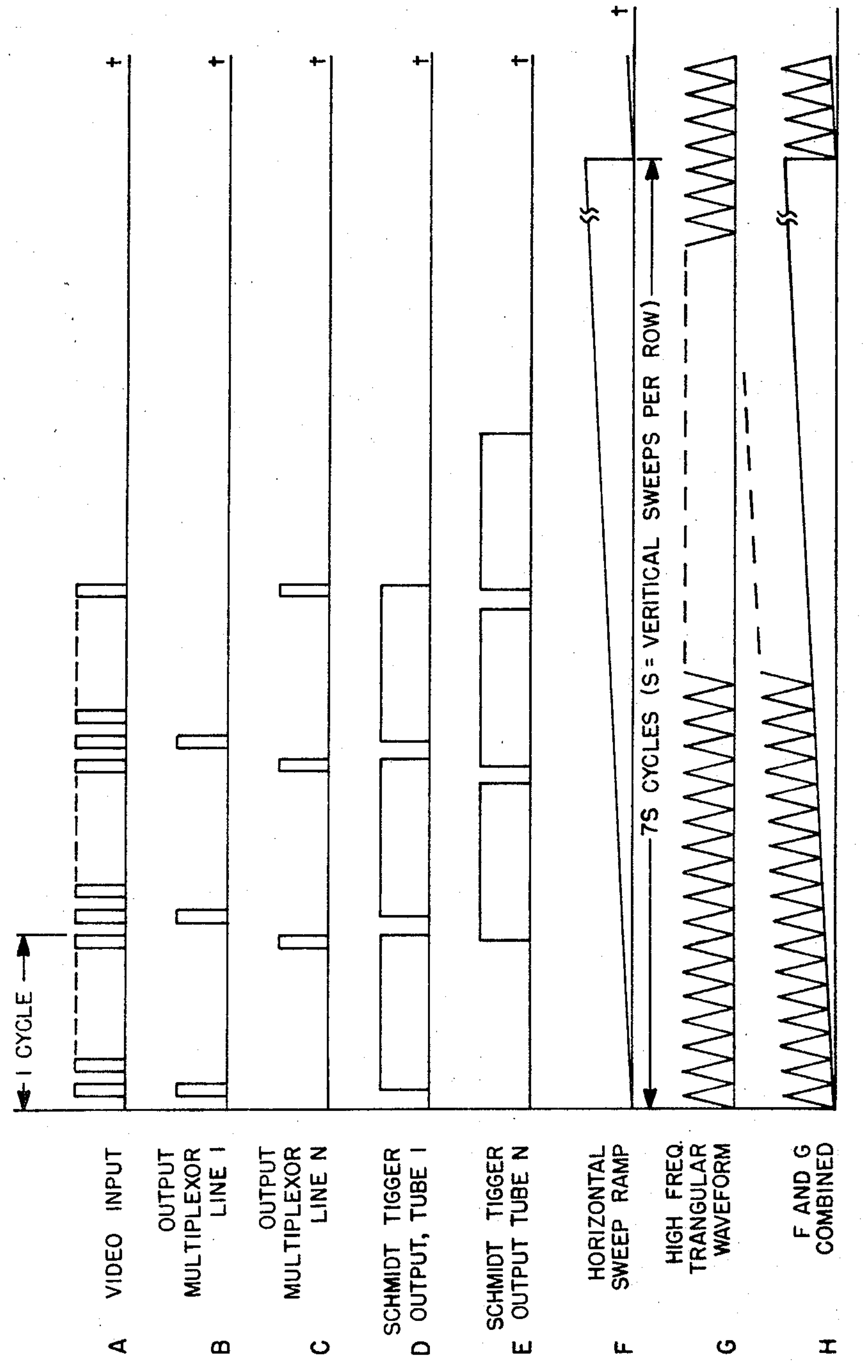
FIG. 2 is a diagram illustrating the waveforms which appear at various points in the circuit of FIG. 1.
Figure 3:
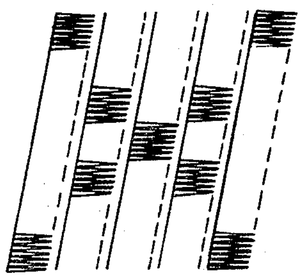
FIG. 3 is a diagram illustrating one character of the display obtained with the preferred embodiment of the invention.
Figure 5:
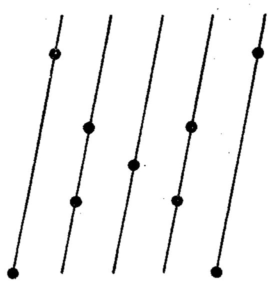
FIG. 5 is a diagram illustrating one character of the display which is obtained when neither of the image-intensifying features of this invention are employed.

In operation, vertical step circuit 20, vertical sweep circuit 22, and horizontal sweep circuit 28, in conjunction with their corresponding amplifiers 16 and 12, combine to cause a raster pattern of the type shown in the before-mentioned Belcher et al. application to be repetitively traced on the face of each of the CRT's 10A–10N. This pattern is made up of a plurality of horizontal sweeps, the number of horizontal sweeps being equal to the number of rows of characters to be displayed on the face of the tube, with a plurality of vertical sawtooth-like excursions for each of the sweeps. FIG. 5, for example, illustrates five of the vertical excursions for a single horizontal sweep. The embodiment of the invention shown in FIG. 1 superimposes on this normal raster pattern a high-frequency triangular waveform from gentrator 32. The shape of this waveform is shown, for example, in FIG. 2G. While the exact frequency of this waveform is not critical, it should generally be of the same order of magnitude as the video input. Three megacycles would, for example, be a suitable frequency for this waveform. FIG. 2H shows the resultant waveform which is applied to horizontal deflection amplifier 12. A similar waveform is obtained on common horizontal deflection line 14. The effect of the additional high-frequency waveform on the raster pattern is shown in FIG. 3. The dotted lines in this figure represent portions of the raster pattern which are not visible because, as will be described later, no intensity input is present.

Video pulses for controlling the intensity input of the CRT's are applied, from a source not shown, to multiplexer 52. Multiplexer 52 distributes these pulses to lines 50A–50N on the basis of the time in the cycle at which they occur. Referring now to FIG. 2A, it is seen that there are N pulse intervals in a cycle. If a video pulse occurs during the first of these pulse intervals, the multiplexer applies the pulse to line 50A. Similarly, a pulse occurring during the second of these pulse intervals is applied by the multiplexer to line 50B. And, as may be seen from line 2C, a pulse occurring during the Nth pulse interval is applied by the multiplexer to line 50N.

Each of the pulses applied to a line 50A–50N is of a relatively short time duration, so that if these pulses were applied directly to the intensity inputs of the CRT's, small intensity dots of the type shown in FIG. 5 would be obtained on the viewing screen. With a high-frequency triangular waveform superimposed on the horizontal deflection input, these dots would be expanded to horizontal lines, but would still be difficult to see. Therefore, in order to provide improved visibility while still retaining the advantages of a multiplex system, the video pulses on lines 50A–50N are each applied to a corresponding Schmitt trigger 48A–48N. Referring now to FIG. 2D, it is seen that a video pulse on line 50A (FIG. 2B) causes an output from Schmitt trigger 48A which lasts for a period of time just less than that of a full video cycle. In other words, the output from Schmitt trigger 48A terminates just before the time when another video pulse for CRT 10A could appear on video input line 54. Each of the other Schmitt triggers 48B–48N has a similar duration. The possible up times for trigger 48N may be observed from FIG. 2E.

Figure 4:
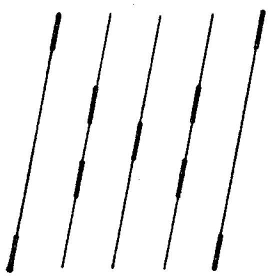
FIG. 4 is a diagram illustrating one character of the display which is obtained when a high frequency waveform is not superimposed on each writing stroke.

The advantage of using the Schmitt trigger outputs to energize the intensity inputs of the CRT may be observed from FIG. 4. Instead of a single dot, an intensity line is obtained for each video input. When the high frequency triangular waveform from generator 32 is superimposed on the normal raster pattern, this line is expanded to provide a display of the type shown in FIG. 3. From this figure, it can be seen that, by use of the two image-intensifying features of this invention, a large, easily-seen square is obtained for each video input, rather than a single small dot as shown in FIG. 3. Since the beam has swept over the entire area of the square, the total energy applied to the phosphor is substantially increased, resulting in a substantial increase in the brightness of the display. However, the average brightness for any point on the display remains the same and the phosphor is therefore not overdriven. Also, since the increased size of the dot results from a controlled sweep with a waveform of known amplitude, the dot size is uniform and fuzzy edges are eliminated.

From FIGS. 2D and 2E, it is apparent that the squares for a character on tube 10A are going to be displaced from the corresponding squares on tube 10N. However, a vertical centering adjustment is provided in the before-mentioned Belcher et al. application which permits the position of corresponding squares on the various tubes to be normalized.

In the description so far only high-frequency triangular waveform generator 32 has been utilized. Since a triangular waveform moves with constant velocity, a square having uniform intensity or brilliance may be obtained by use of this waveform. A similar result may be obtained using a sawtooth waveform even though the wave does not move at constant velocity. The reason for this is that the return stroke is so rapid as to not be visible on the screen. The disadvantage of using a sawtooth waveform is that only a portion of the beam is used for writing. Other waveforms which do not move at constant velocity would produce a square of non-uniform intensity. For example, if a sine-wave was used, the square would be darker at the left- and right-hand sides, where the beam is moving slowly, and lighter in the middle where the beam is moving fast.

Figure 6:
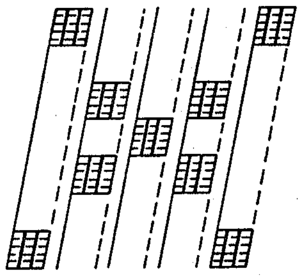
FIG. 6 is a diagram showing one character of the display which is obtained utilizing a modified embodiment of the invention.

Under normal circumstances a non-uniform illumination of the square is undesirable and a triangular waveform would be employed. However, under special circumstances, it may be desirable to have a square with non-uniform illumination. An example of such a situation would be where the CRT is being used to display graphic data and the graph contains more than one line. Since the lines may run close to each other at some points, and cross each other at other points, it may be difficult to determine which squares are being used to form which line of the graph. Under these conditions, switch 30 could be in the position shown in FIG. 1 when a square for one of the graphs is being projected on the viewing screen, and switch 30 could be transferred to its alternate position, under, for example, computer control, to superimpose a special waveform on the normal raster pattern when squares for the other line of the graph are being formed. If the special waveform is a step wave with fairly steep sides and two horizontal steps, squares of the type shown in FIG. 6 would be obtained. It is apparent that squares of this type on a viewing screen could easily be distinguished from those shown in FIG. 3.

A system has therefore been provided for intensifying the images on the face of a CRT, or similar beam-activated viewing device, so that the images may be viewed from a relatively great distance. It is, of course, apparent that, while square images have been shown for the preferred embodiment of the invention, the relative parameters could be adjusted to provide rectangular images, or images having other desired shapes. It is also apparent that, while horizontal sweeps, vertical writing strokes, and a horizontal high-frequency waveform have been employed in the preferred embodiment of the invention, the invention is equally applicable when all of these directions are reversed. Other similar changes might also be made in the raster pattern. Further, the image intensification features of this invention may, in certain situations, be employed separately as well as jointly.

While the invention has been particularly shown and described with reference to a preferred embodiment thereof, it is to be understood by those skilled in the art that the foregoing and other changes in form and detail may be made therein without departing from the spirit and scope of the invention.

What is claimed is:

1. A display system of the type wherein information is displayed by sweeping an electro-responsive beam across a beam responsive viewing screen in a plurality of writing strokes, and wherein the beam is intensified when it is adjacent selected ones of a plurality of discrete index points on each writing stroke, characterized by:
- means for increasing the brightness of the display by enlarging the area on said viewing screen which is intensified for each of said selected index points by a controlled amount, said increased area being intensified during each of said writing strokes.

2. A system of the type described in claim 1 wherein said means for increasing the brightness of the display includes means for electrically controlling said beam to increase the width of each of said writing strokes by a controlled amount.

3. A system of the type described in claim 2 wherein said means for electrically controlling said beam includes means for superimposing on each of said writing strokes a high-frequency waveform at an angle substantially perpendicular to that of the writing strokes.

4. A system of the type described in claim 3 wherein the waveform superimposed by said high-frequency waveform superimposing means is a triangular waveform.

5. A system of the type described in claim 3 wherein said beam generating means and said viewing screen form part of a CRT.

6. A system of the type described in claim 3 wherein said high-frequency waveform causes each of said writing strokes to cover a predetermined area of said viewing screen; and including
- means for varying the shape of said waveform to provide selected beam intensity patterns within the predetermined area covered by each stroke.

7. A system of the type described in claim 3 wherein the electro-responsive beam is controlled by means which includes:
- means for electrically controlling said beam to perform a separate horizontal sweep of said viewing screen for each row of data to be displayed; and
- means for electrically controlling said beam to perform a plurality of vertical writing strokes for each of said horizontal sweeps; and
- wherein said high-frequency waveform is a horizontal waveform.

8. A system of the type described in claim 2 wherein there is a plurality of said beam generating means and a viewing screen for each of said beam generating means;
- wherein said means for electrically controlling said beam are common to all said beam generating means; and including
- means for applying a cyclic train of short beam-intensifying pulses to the system, the position of a pulse in its cycle indicating the beam generating means to which it is to be directed;
- means for directing each of said beam intensifying pulses to the proper beam generating means; and
- means for lengthening the duration of each of the directed beam intensifying pulses to a time greater than that for each short pulse, but less than the cycle time of the pulse train.

9. A system of the type described in claim 8 wherein said lengthening means includes a single-shot trigger means for each of said beam generating means.

10. A system of the type described in claim 9 wherein the time duration of each of said single-shot trigger means is slightly less than the time between two pulses of said pulse train which are to be directed to the same beam generating means.

11. A system of the type described in claim 9 wherein said means for electrically controlling said beam includes means for superimposing on each of said writing strokes a high-frequency waveform at an angle substantially perpendicular to that of the writing strokes.

12. A display system comprising:
- a plurality of means for generating electro-responsive beams;
- a viewing screen for each of said beam generating means;
- common means for electrically controlling each of said beams to trace a predetermined raster pattern on the corresponding viewing screen;
- means for applying a cyclic train of short beam-intensifying pulses to the system, the position of a pulse in its cycle indicating the beam generating means to which it is to be directed;
- means for directing each of said beam intensifying pulses to the proper beam generating means; and
- means for lengthening the duration of each of the directed beam intensifying pulses to a time greater than that for each short pulse, but less than the cycle time of the pulse train.

13. A system of the type described in claim 12 wherein said common means includes:
- means for electrically controlling each beam to perform a separate horizontal sweep of the corresponding viewing screen for each row of data to be displayed; and
- means for electrically controlling each of said beams to perform a plurality of vertical writing strokes for each of said horizontal sweeps.

14. A system of the type described in claim 12 wherein said lengthening means includes a single-shot trigger means for each of said beam generating means.

15. A system of the type described in claim 14 wherein the time duration of each of said single shot trigger means is slightly less than the time between two pulses of said pulse train which are to be directed to the same beam generating means.

16. A system of the type described in claim 12 wherein each beam generating means, in combination with its corresponding viewing screen, forms part of a CRT.

References Cited

UNITED STATES PATENTS

| | | | |
|---|---|---|---|
| 2,755,414 | 7/1956 | Snyder | 315—22 |
| 2,849,648 | 8/1958 | Thompson. | |

RODNEY D. BENNETT, *Primary Examiner.*

T. H. TUBBESING, *Assistant Examiner.*

U.S. Cl. X.R.

315—23, 26; 340—324